US012299918B2

(12) United States Patent
Alaghi et al.

(10) Patent No.: US 12,299,918 B2
(45) Date of Patent: May 13, 2025

(54) METHODS AND SYSTEMS TO FACILITATE PASSIVE RELOCALIZATION USING THREE-DIMENSIONAL MAPS

(71) Applicant: Meta Platforms Technologies, LLC, Menlo Park, CA (US)

(72) Inventors: Armin Alaghi, Kirkland, WA (US); Muzaffer Kal, Redmond, WA (US); Vincent Lee, Seattle, WA (US); Richard Andrew Newcombe, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 77 days.

(21) Appl. No.: 17/585,439

(22) Filed: Jan. 26, 2022

(65) Prior Publication Data
US 2023/0237692 A1 Jul. 27, 2023

(51) Int. Cl.
*G06T 7/13* (2017.01)
*G06T 7/73* (2017.01)
*H04W 4/06* (2009.01)

(52) U.S. Cl.
CPC ............... *G06T 7/73* (2017.01); *H04W 4/06* (2013.01)

(58) Field of Classification Search
CPC ........... G06T 7/73; G06T 19/006; G06T 7/75; G06T 2207/30244; H04W 4/06;
(Continued)

(56) References Cited

U.S. PATENT DOCUMENTS 9,063,330 B2 * 6/2015 LaValle ................ G02B 27/017
9,964,409 B1 5/2018 Flint et al.
(Continued)

FOREIGN PATENT DOCUMENTS

EP 3419286 A1 12/2018
WO 2013155217 A1 10/2013
(Continued)

OTHER PUBLICATIONS

Balntas V., et al., "HPatches: A Benchmark and Evaluation of Handcrafted and Learned Local Descriptors," Computer Vision and Pattern Recognition (CVPR), Apr. 19, 2017, arXiv:1704.05939v1 [cs.CV], 10 Pages.
(Continued)

*Primary Examiner* — Abderrahim Merouan
(74) *Attorney, Agent, or Firm* — Potomac Law Group, PLLC; Dannon G. Allbee

(57) ABSTRACT

A method includes accessing map data of an area of a real environment, the map data comprising three-dimensional feature descriptors describing features visible in the real environment. A plurality of map packages are generated based on the map data, wherein each of the map packages (1) corresponds to a two-dimensional sub-area within the area of the real environment, and (2) comprises a subset of the three-dimensional feature descriptors describing features visible in the sub-area. A first sequence of the plurality of map packages are broadcast through one or more base stations, wherein the first sequence is based on the two-dimensional sub-area of each of the map packages, wherein each of the map packages is configured to be received and used by an artificial-reality device to determine a pose of the artificial-reality device in the associated sub-area based on the associated subset of the three-dimensional feature descriptors.

20 Claims, 7 Drawing Sheets

(58) Field of Classification Search
CPC .............. G02B 27/0179; G02B 27/017; G02B 27/0093; G02B 2027/0187; G02B 2027/0138; G02B 2027/0178; G06F 3/005; G06F 3/012; G06F 3/011
See application file for complete search history.

(56) References Cited

U.S. PATENT DOCUMENTS

| | | | |
|---|---|---|---|
| 10,338,392 | B2 | 7/2019 | Kohler et al. |
| 10,346,623 | B1* | 7/2019 | Brandwine ............ G06F 21/554 |
| 10,466,953 | B2 | 11/2019 | Eade et al. |
| 10,657,701 | B2 | 5/2020 | Osman et al. |
| 11,024,079 | B1 | 6/2021 | Chuah et al. |
| 11,158,130 | B1 | 10/2021 | Rubaiat Habib et al. |
| 11,222,468 | B1 | 1/2022 | Lovegrove et al. |
| 11,295,460 | B1 | 4/2022 | Aghdasi et al. |
| 11,481,925 | B1 | 10/2022 | Li et al. |
| 11,670,045 | B2 | 6/2023 | Zhang et al. |
| 2005/0249426 | A1 | 11/2005 | Badawy |
| 2012/0300020 | A1* | 11/2012 | Arth ........................ G06T 7/75 348/E7.001 |
| 2012/0306850 | A1* | 12/2012 | Balan ................... G06F 3/0304 345/419 |
| 2014/0267234 | A1 | 9/2014 | Hook et al. |
| 2015/0029218 | A1* | 1/2015 | Williams ........... G02B 27/0172 345/633 |
| 2015/0062125 | A1 | 3/2015 | Aguilera Perez et al. |
| 2015/0331970 | A1 | 11/2015 | Jovanovic |
| 2016/0364912 | A1 | 12/2016 | Cho et al. |
| 2017/0115488 | A1* | 4/2017 | Ambrus ............. G02B 27/0172 |
| 2017/0243403 | A1 | 8/2017 | Daniels et al. |
| 2017/0337749 | A1 | 11/2017 | Nerurkar et al. |
| 2017/0345167 | A1 | 11/2017 | Ard et al. |
| 2018/0053329 | A1 | 2/2018 | Roberts et al. |
| 2018/0122139 | A1 | 5/2018 | Janzer et al. |
| 2018/0143023 | A1 | 5/2018 | Bjorke et al. |
| 2018/0143756 | A1 | 5/2018 | Mildrew et al. |
| 2018/0144547 | A1 | 5/2018 | Shakib et al. |
| 2018/0232937 | A1 | 8/2018 | Moyer et al. |
| 2019/0026956 | A1 | 1/2019 | Gausebeck et al. |
| 2019/0051054 | A1 | 2/2019 | Jovanovic et al. |
| 2019/0236842 | A1 | 8/2019 | Bennett et al. |
| 2019/0287311 | A1 | 9/2019 | Bhatnagar et al. |
| 2020/0066046 | A1 | 2/2020 | Stahl et al. |
| 2020/0099954 | A1 | 3/2020 | Hemmer et al. |
| 2020/0175764 | A1 | 6/2020 | Romea et al. |
| 2020/0250879 | A1 | 8/2020 | Foster et al. |
| 2020/0302681 | A1 | 9/2020 | Totty et al. |
| 2020/0364901 | A1* | 11/2020 | Choudhuri ............ G06T 19/006 |
| 2021/0056762 | A1 | 2/2021 | Robbe et al. |
| 2021/0304509 | A1 | 9/2021 | Berkebile |
| 2021/0326026 | A1 | 10/2021 | Osipov et al. |
| 2022/0043446 | A1* | 2/2022 | Ding ............... B60W 60/00276 |
| 2022/0122285 | A1 | 4/2022 | Suleiman et al. |
| 2022/0130064 | A1 | 4/2022 | Tomar |
| 2022/0254207 | A1* | 8/2022 | Billy ..................... G08C 17/02 |
| 2022/0269885 | A1 | 8/2022 | Wixson et al. |
| 2023/0125390 | A1 | 4/2023 | Noris et al. |
| 2023/0127307 | A1 | 4/2023 | Noris et al. |

FOREIGN PATENT DOCUMENTS

| | | |
|---|---|---|
| WO | 2015192117 A1 | 12/2015 |
| WO | 2021010660 A1 | 1/2021 |
| WO | 2021188741 A1 | 9/2021 |

OTHER PUBLICATIONS

International Search Report and Written Opinion for International Application No. PCT/US2020/027763, mailed Jul. 23, 2020, 12 Pages.

Mur-Artal R., et al., "ORB-SLAM: a Versatile and Accurate Monocular SLAM System," IEEE Transactions on Robotics, Sep. 18, 2015, arXiv:1502.00956v2 [cs.RO], 18 Pages, DOI: 10.1109/TRO.2015.2463671.

Tian Y., et al., "SOSNet: Second Order Similarity Regularization for Local Descriptor Learning," Computer Vision and Pattern Recognition (CVPR), Dec. 16, 2019, arXiv:1904.05019v2 [cs.CV], 10 Pages.

International Search Report and Written Opinion for International Application No. PCT/US2022/052472, mailed Apr. 17, 2023, 11 pages.

International Search Report and Written Opinion for International Application No. PCT/US2023/011579, mailed May 17, 2023, 12 pages.

Morrison J. G., et al., "Scalable Multirobot Localization and Mapping with Relative Maps: Introducing MOARSLAM," IEEE Control Systems, vol. 36, No. 2, Apr. 1, 2016, pp. 75-85.

International Preliminary Report on Patentability for International Application No. PCT/US2022/047864, mailed May 10, 2024, 12 pages.

International Search Report and Written Opinion for International Application No. PCT/US2022/047864, mailed Apr. 6, 2023, 15 pages.

International Preliminary Report on Patentability for International Application No. PCT/US2023/011579, mailed Aug. 8, 2024, 10 pages.

\* cited by examiner

METHODS AND SYSTEMS TO FACILITATE PASSIVE RELOCALIZATION USING THREE-DIMENSIONAL MAPS

TECHNICAL FIELD

This disclosure generally relates to facilitating access to three-dimensional maps.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A mobile computing device-such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments disclosed herein provide a passive relocalization technique for artificial reality devices using feature maps. Passive relocalization involves determining a pose of a device using only received network transmissions (e.g., one-directional transmission from a computer, server, AR device, etc.) for mapping an localization functionality, without the need to transmit information. In particular embodiments a sequence of map packages comprising one or more feature descriptors may be broadcast from one or more base stations for a particular area or a sub-area. Each map package may correspond to a particular 2D or 3D sub-area in physical space of the area covered by the feature map. The data associated with each map package may include one or more features that are observable from within the particular sub-area. One or more map packages may be broadcast over the air via one or more base stations to one or more artificial reality devices. The map packages may be broadcast in a particular sequence or assigned to a particular base station in order to best optimize broadcasts for devices. Upon receiving a relevant map package, the device may perform localization by matching features descriptors generated from an image captured on the device of the surrounding real environment with one or more feature descriptors within the received map packages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
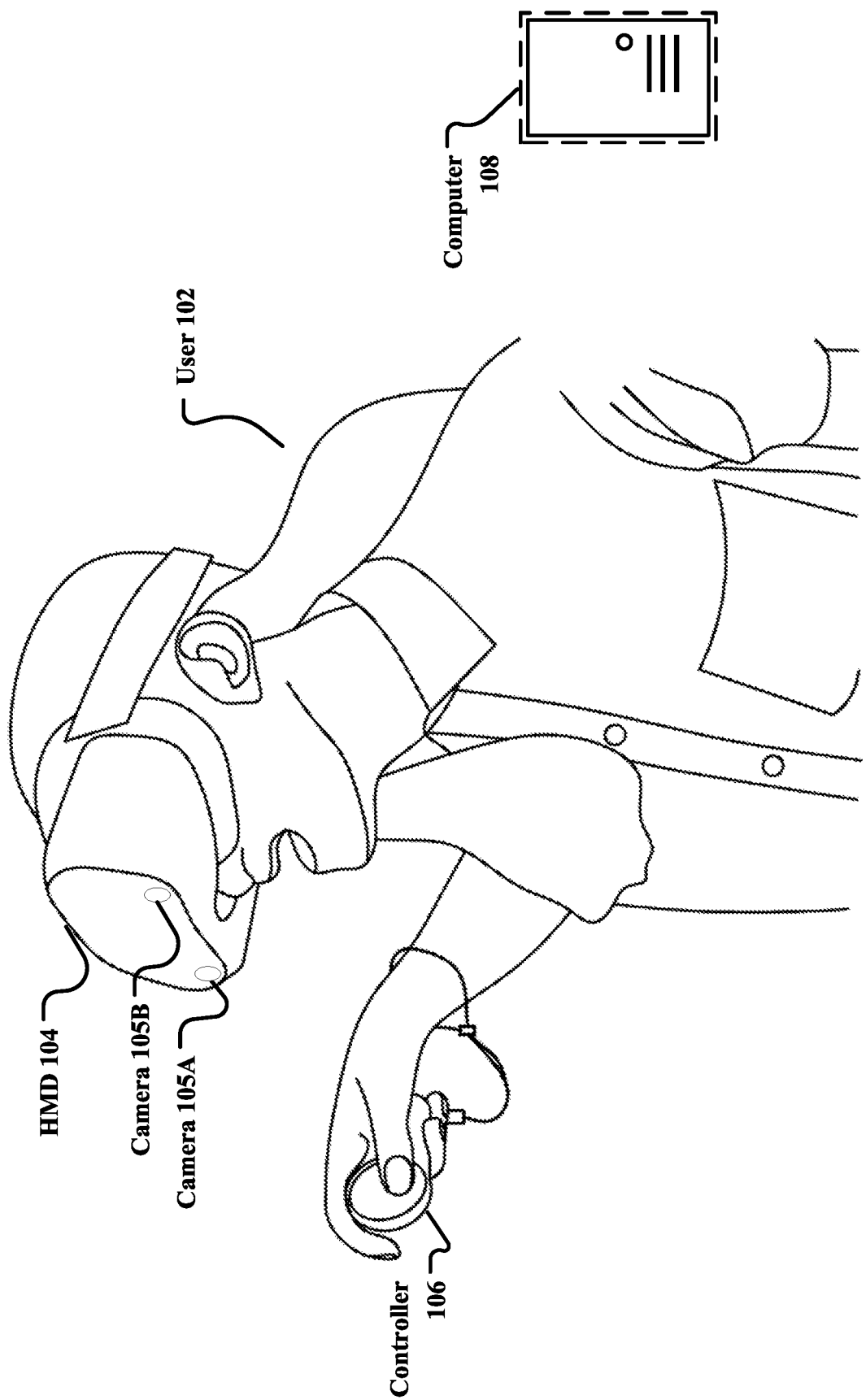
FIG. 1A illustrates an example artificial reality system and user.

FIG. 1A illustrates an example artificial reality system 100 and user 102. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include an eye tracking system to determine a vergence distance of the user 102. A vergence distance may be a distance from the user's eyes to objects (e.g., real-world objects or virtual objects in a virtual space) that the user's eyes are converged at. The headset 104 may be referred to as a head-mounted display (HMD). One or more controllers 106 may be paired with the artificial reality system 100. In particular embodiments one or more controllers 106 may be equipped with at least one inertial measurement units (IMUs) and infrared (IR) light emitting diodes (LEDs) for the artificial reality system 100 to estimate a pose of the controller and/or to track a location of the controller, such that the user 102 may perform certain functions via the controller 106. In particular embodiments the one or more controllers 106 may be equipped with one or more trackable markers distributed to be tracked by the computing system 108. The one or more controllers 106 may comprise a trackpad and one or more buttons. The one or more controllers 106 may receive inputs from the user 102 and relay the inputs to the computing system 108. The one or more controllers 106 may also provide haptic feedback to the user 102. The computing system 108 may be connected to the headset 104 and the one or more controllers 106 through cables or wireless connections. The one or more controllers 106 may include a combination of hardware, software, and/or firmware not explicitly shown herein so as not to obscure other aspects of the disclosure.

Figure 1B:
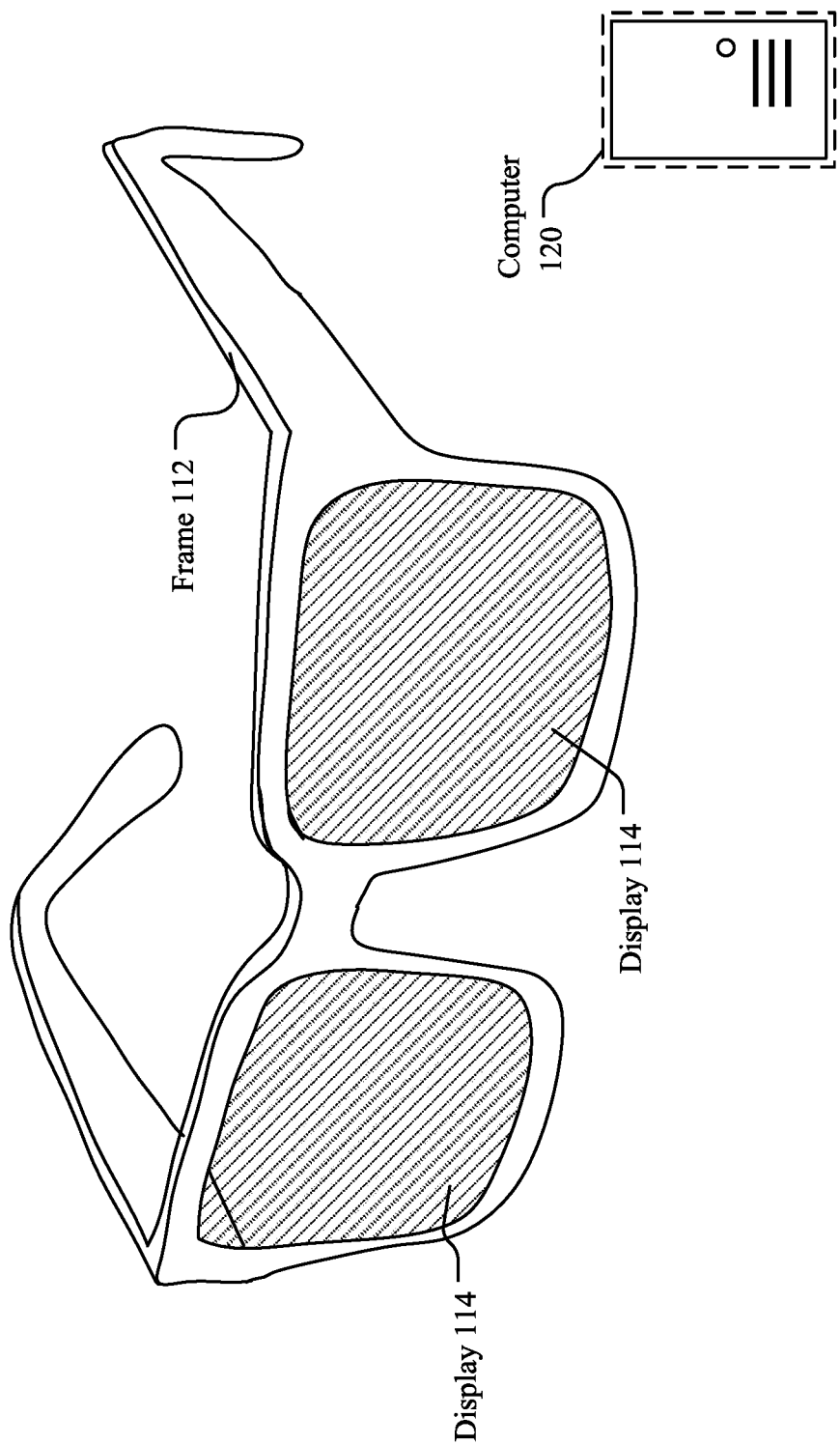
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Users of artificial reality systems often wish to traverse and experience areas beyond a particular room or area, for example and not by way of limitation, by moving throughout rooms or floors of a particular building, leaving the building and walking down a particular street, exploring a public space (e.g., a public park), or visiting another user's space (e.g., a second user's living room). As a user moves throughout these spaces, artificial reality systems must provide synchronized, continuous, and updated feature maps with low latency in order to provide a high quality, immersive, and enjoyable experience for users. A feature map may comprise a digital representation of a particular area that comprises multiple layers of map data. Map data may include, for example and not by way of limitation, geometry and semantics of a particular environment (e.g., 3D meshes, point clouds, three-dimensional or two-dimensional feature descriptors, coordinate frames, etc.), placement, persistency, and other features of virtual content that is displayed in an artificial reality environment (e.g., floating or anchored content), or organization of virtual content in the artificial reality environment (e.g., grouping by 2D or 3D plane).

In particular embodiments feature maps may be generated using data provided through a variety of mechanisms, including for example crowdsourced photos, video and image sequences, or pedestrian or vehicular apparatuses. Using captured data, the computing system can associate the captured data and recover the 3D geometry and appearance of the 3D scene using captured data from multiple viewpoints and output map data, which may contain multiple layers of information (e.g., localization maps, 3D meshes, semantic maps, depth maps, point clouds, feature descriptors, keypoints, etc.) for the particular area. Computing systems can provide, index, and update the feature maps that correspond to a particular area for one or more users. In particular embodiments feature maps can be generated, stored, and updated locally on an artificial reality device (e.g., stored for offline use by the device).

To be most effective and valuable feature maps must be regularly updated to maintain accurate and up-to-date representations of the real environment they represent. One way to update and maintain the accuracy of map data for a particular area is to share and crowdsource feature maps or portions of feature maps among a plurality of users. The feature map or portions of feature maps generated by each user's artificial reality device may be directly shared with other users, or uploaded to a second computing system (e.g., a cloud or a server), where it can be accessed and downloaded by other users. In particular embodiments feature maps generated by a particular artificial reality device may also or alternatively be stored locally (e.g., on the user's artificial-reality device). However, for larger areas (e.g., a park or shopping mall), or when the user experiences a new environment, the HMD may have limited storage capacity to store the appropriate feature map on the device. In these situations, feature maps may need to be shared between devices or downloaded from a cloud server to facilitate localization and other functionality in these new areas.

Feature maps may be used for a variety of functions, for example and not by way of limitation in conjunction with visual-based algorithms to localize and pose (e.g., 6 degrees of freedom) the user of an artificial reality device in a particular environment. Traditionally, to localize a device using feature maps, the device may need to share data, for example and not by way of limitation, a last known location or an image captured by the device (or features thereof) to a server. The server may use the transmitted data to determine the location of the artificial reality device by matching features descriptors generated from the captured image with one or more feature descriptors within the stored feature maps stored on the server. The determined location can then be transmitted from the server to the device. Alternatively, a device may perform localization by receiving one or more feature maps from a second device (e.g., a server, a second artificial reality device, etc.), which allows the device to match features descriptors generated from the captured image with one or more feature descriptors within the received feature maps.

Using feature maps for localization has distinct advantages, including for example, reduced reliance on other positioning technologies (e.g., wireless positioning system (WPS), global navigation satellite system (GNSS), GPS, inertial measurement unit-based (IMU-based) systems like TLIO, visual-based, etc. or any combination of the above) These positioning technologies also suffer from other limitations for artificial reality applications. As an example, GPS allows localization but it has several limitations: (1) it's not always reliably available especially in dense urban environments (due to interference indoors or due to skyscrapers), (2) the granularity of the estimation is not usable for many machine perception applications, and (3) GPS does not allow for localization of a pose (e.g., 6 degrees of freedom) of the device, just the 3D position (e.g., 3 degrees of freedom).

As another example, many traditional positioning technologies rely on frequent transmission that subsequently drain power and computing resources. Frequent (or continuous) collection and transmission of data to perform localization requires large power, energy, performance, and resource budgets. This is particularly important for small profile artificial reality devices (e.g., those with size and weight requirements limitations to enable the user to wear the device all day without fatigue) where battery capacity, computing power, and other resource budgets are limited by the need for an ergonomic and user-friendly design. Not having to frequently transmit localization information allows the device to consume less power.

Privacy and security are also important considerations when sharing and crowdsourcing 3D feature maps and data among users. Due to the size and sensitivity of the data, there is a need to reduce transmissions of volumes of data collected at large scale. For example, users could simply consistently capture and upload image data that could be shared with a remote data repository to facilitate localization. Yet such an approach would compromise privacy by requiring sharing and storing personalized image data. For example, users may prefer not to share images that are captured while they experience an environment, which may permit others to ascertain the location or activities of the user. As another example, a user may prefer not to share images of their bedroom, bathroom, or other private areas of their home. Accordingly, there is a need to permit accurate localization amongst a plurality of users without transmitting and storing large volumes of potentially personalized user data (e.g., images of the user's private spaces). Thus, there is a need for a mapping and relocalization technique that minimizes computing resources and maintains accurate device localization without sensitive user data leaving the artificial reality device.

Particular embodiments disclosed herein provide a passive relocalization technique for artificial reality devices using feature maps. Passive relocalization involves determining a pose of a device using only received network transmissions (e.g., one-directional transmission from a computer, server, second AR device, etc.) for mapping and localization functionality, without the need to transmit information from the localized device. Benefits of passive relocalization include dramatically enhanced privacy and security properties of a system where user information is never transmitted to third parties or aggregated on the cloud. Passive localization is further desirable because of the low power consumption required relative to other localization techniques that consume power using traditional two-way communications (e.g., satellite, internet, Wi-Fi, sound, electrical communications, etc.) for mapping and localization. Passive relocalization is further useful in real environments with low cellular reception (e.g., indoors, outdoor wilderness, etc.), and in scenarios where a user prefers not to reveal their position for privacy reasons but still wants to use localization.

In particular embodiments, a feature map may be divided, stored, and transmitted as a sequence of one or more map packages comprising one or more sub-areas of the area covered by the feature map to facilitate more efficient sharing and optimization of localization. If the entire feature map for a particular area was transmitted to facilitate localization in new environments, more resources would be consumed by the device to store a larger quantity of data and determine the pose of the user from a larger library of potential poses. Thus, dividing each feature map into map packages corresponding to a particular sub-area enables smaller storage requirements, and more accurate and faster localization. Each map package may correspond to a particular 2D or 3D sub-area in physical space of the area covered by the feature map. The data associated with each map package may include one or more features that are observable from within the particular sub-area. This may include "local" feature descriptors that are located and visible within the sub-area (e.g., trees, signs, fountains, etc.) and "global" features that are not located in the sub-area but can still be observed from within the particular sub-area (e.g., mountains, tall skyscrapers, etc.). For example, for a particular feature map for an entire city (e.g., San Francisco, CA), the feature map may be divided into multiple map packages based on particular sub-areas of the (e.g., different map packages for each neighborhood, street, block, etc. in the city), or the feature map may be divided into multiple map packages such that each map package covers an equal area (e.g., each map package may cover a 100 m×100 m area of the geographic area covered by the feature map).

In particular embodiments the particular size of the geographic sub-area for each map may be determined so the artificial reality device has an optimized bounded search space for localization. Because pose optimization is computationally expensive, the search space must be limited to provide bounds for search optimization. For example, the size of the sub-area encompassed by a particular map package may be varied to reduce the search area for the device. If the sub-area is too large, the device would have to store large quantities of map data and may take longer to localize the device. Additionally, as the area of feature map increases, the accuracy of the pose may be less accurate. Map packages may further comprise metadata associated with the map package that permits a receiving device to identify, without fully analyzing, what information is contained within a particular map package. For example, the metadata may comprise an approximate location of the 2D sub-area associated with the map package. As another example, if the user has a GPS or last known location, the metadata may comprise information indicating which GPS region the sub-area of the map package is located.

In particular embodiments multiple map packages may be generated with varying levels of detail (e.g., with different quantities of feature descriptors that can be utilized for localization). Map packages of varying detail may be broadcast for the same geographic area or sub-area. An advantage of providing map packages for the same area or sub-area with different levels of detail is the ability to customize data transmissions based on the level of accuracy of localization required for a particular device. For example, if a particular artificial reality device or application the user is executing requires only a coarse pose, the device may download a low detail coarse map package, which has less feature descriptors (and therefore less-accurate localization) for a particular sub-area but is smaller in data size, thereby conserving computing resources and allowing for faster, but less accurate localization. Alternatively, if a particular artificial reality device or application the user is executing requires an accurate pose, the device may download a high detail fine map package, which has more feature descriptors (and therefore more-accurate localization) for a particular sub-area but is a larger sized map package relative to the low detail map, thereby allowing for slower, but more accurate localization. In particular embodiments a coarse detail map package may comprise feature descriptors more likely to provide a coarse localization, whereas a fine detail map package may comprise feature descriptors more likely to refine or provide further accuracy to the pose determined using the coarse detail feature package.

In particular embodiments map packages of varying detail may be generated for sub-areas of different geographic sizes. This may allow for a constant file size for each map package regardless of the geographic area covered by the particular map package. As an example, a coarse detail map package (e.g., with fewer feature descriptors/keypoints) could be generated for a 100 m×100 m sub-area, and a fine detail map package (e.g., with more feature descriptors/keypoints relative to the coarse detail map package) for a smaller sub-area, for example a 10 m×10 m sub-area that is a sub-sub-area of the 100 m×100 m sub-area of the coarse detail map package.

Figure 2:
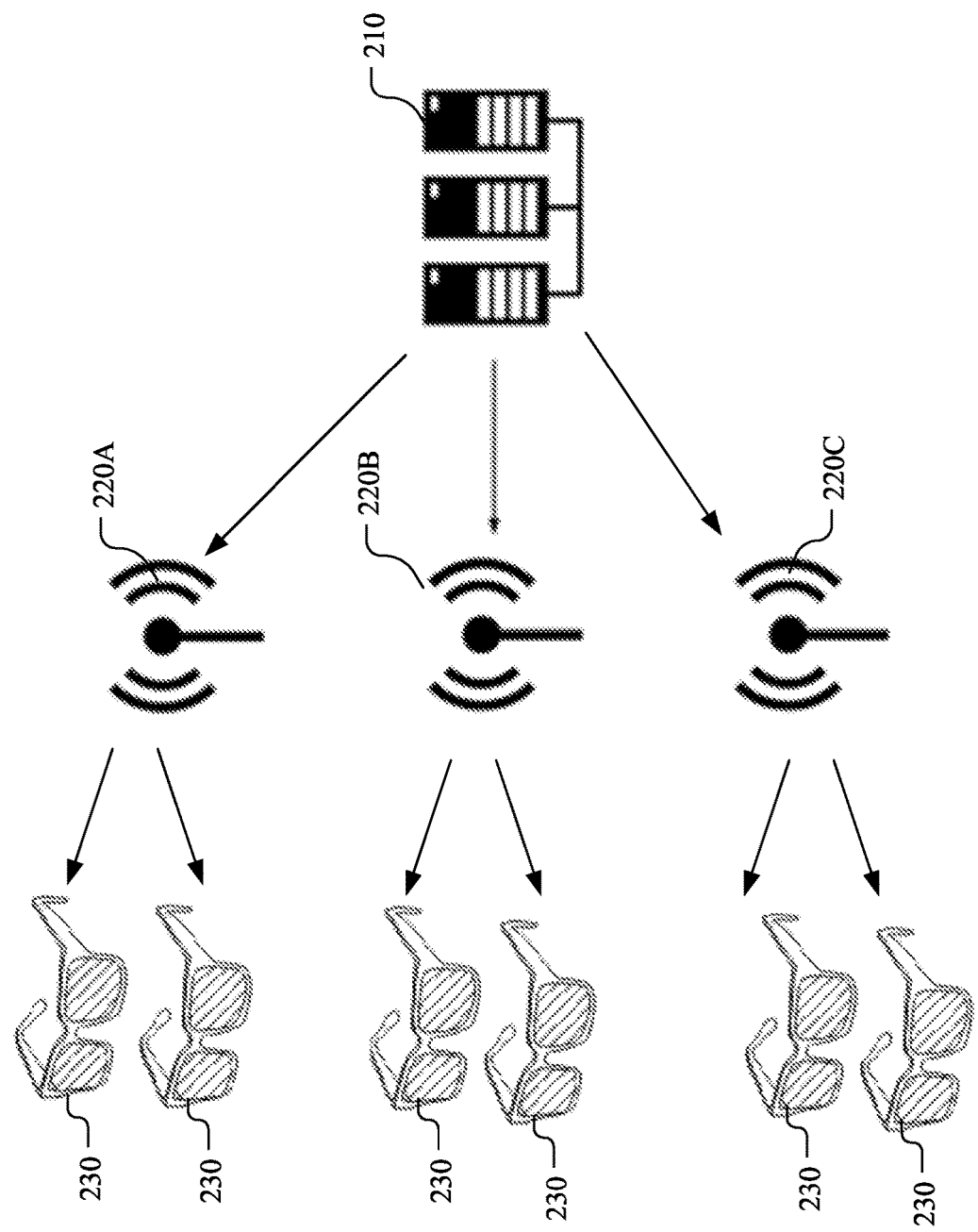
FIG. 2 illustrates a system to facilitate passive relocalization through one-way transmission of feature maps.

FIG. 2 illustrates a system to facilitate passive relocalization through one-way transmission of feature maps. Servers 210 may comprise one or more servers or computing devices that serve as a central repository configured to facilitate storage, management, and other operations associated with distribution of feature maps and map packages. The system may further comprise a map distribution infrastructure comprising one or more base stations 220A-C configured to broadcast and distribute map packages via wireless signal at one or more radio frequencies (e.g., FM radio frequencies or other VHF frequencies). Advantages to using radio frequencies compared to other two-way communications include longer range, no need for time allotments, and no line of sight requirement. Servers 210 may be programmed to determine a broadcasting schedule or sequence for a particular base station, and transmit the particular broadcast instructions to each base station. For example and not by way of limitation, the servers may determine and transmit instructions to a base station to transmit map packages at a particular signal frequency, that a particular base station should broadcast a particular set of map packages in a particular sequence, or that a particular base station should simultaneously broadcast multiple map packages at multiple frequencies. In particular embodiments one or more components of FIG. 2 may include software-defined radio (SDR) devices.

In particular embodiments one or more map packages may be broadcast over the air via one or more base stations 220A-220C to one or more artificial reality devices 230A-230F. Base stations may be capable of broadcasting multiple baselines to distribute map packages, directional parallel transmission, and multi-channel transmissions. In particular embodiments the broadcast signals may be transmitted by the base stations at FM radio frequencies (e.g., 88-108 MHz), although it should be appreciated that any suitable frequency ranges capable of broadcasting data signals may be utilized (e.g., other VHF signals (30 MHz-300 MHz), UHF signals (300 MHz-3 GHz), etc.). The specific frequency of signals which are broadcasted can be varied based on, for example and not by way of limitation, the geographic size of the map area, data size of the map packages, etc., which may dictate the nature of the signals broadcast by base stations 220A-C. For example, if each individual map package broadcast by the base station includes a large quantity of data, a larger frequency may be required for broadcast to ensure sufficient bandwidth to transmit the map packages in a reasonable amount of time. As another example, if the geographic area covered by a particular base station is large, a lower frequency may be required to ensure sufficient signal propagation such that the map packages can be received from anywhere within the particular geographic area. In particular embodiments the radio signal could be beam-formed to further limit the scope of map data transmitted. The map packages can be broadcast without any persistent channel establishment between the base station and device. This allows receive-only devices (e.g., artificial reality headsets 230A-230F) to monitor and dial into this broadcast signal to receive map packages that can be used for on-device localization as described herein.

Figure 3:
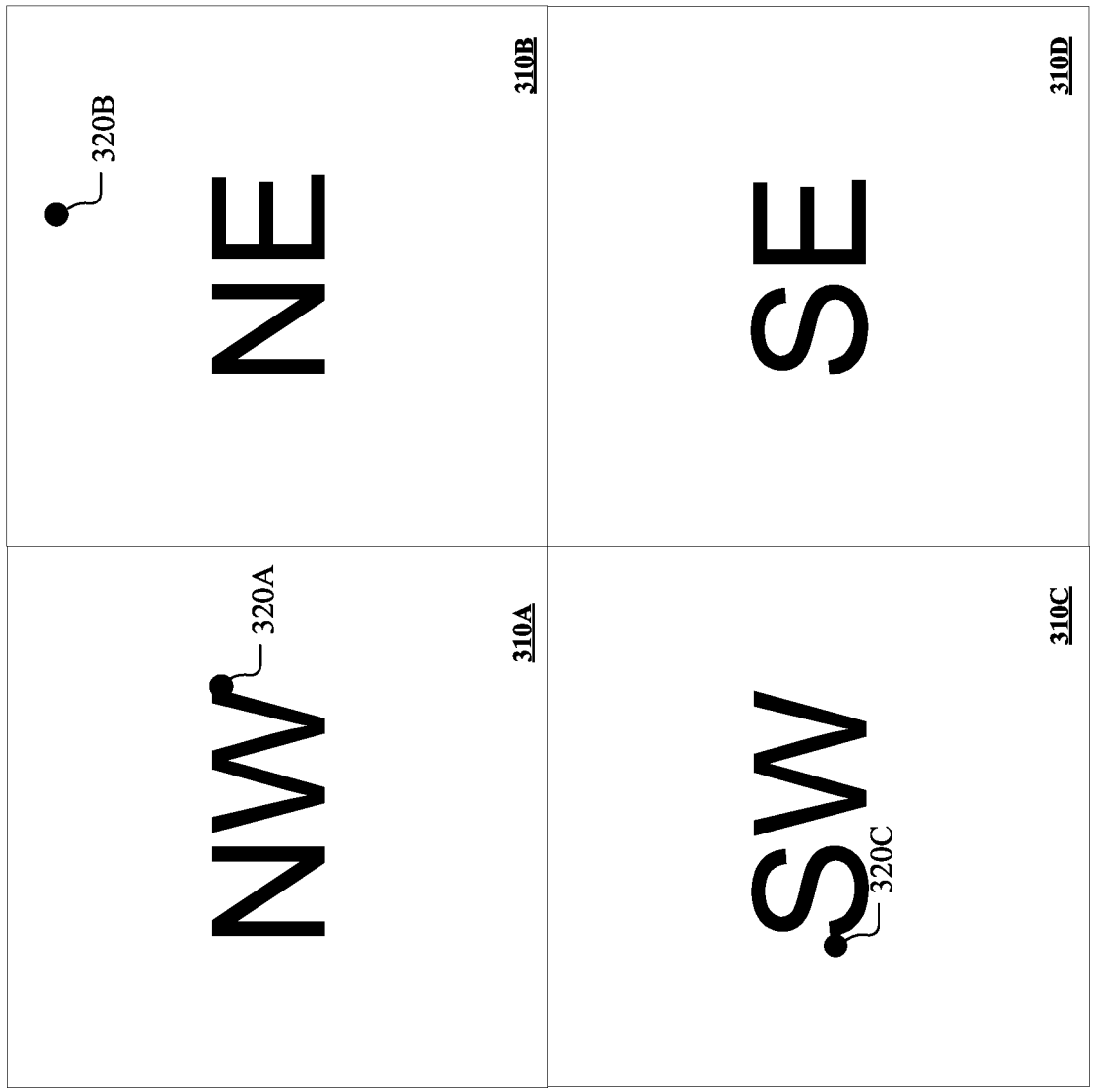
FIG. 3 illustrates a geographic area of a feature map subdivided into map packages for particular sub-areas.

FIG. 3 illustrates a geographic area of a feature map 300 subdivided into map packages for particular sub-areas 310A-310D. In particular embodiments a base station may be responsible for broadcasting map packages corresponding to the particular area inhabited by the base station. For example as illustrated in FIG. 3, base station 320A may broadcast a single map package for sub-area 310A, base station 320B may broadcast a single map package for sub-area 310B, and base station 320C may broadcast a single map package for sub-area 310C. Alternatively, each base station may broadcast multiple map packages corresponding to the particular area inhabited by the base station and nearby adjacent areas. For example, base station 310B may broadcast a sequence of map packages for sub-area 310A and adjacent sub-areas 310B-310D. This may be particularly beneficial when one or more sub-areas do not include a base station, for example sub-area 310D as illustrated in FIG. 3. This allows for complete coverage without the need for a base station in each particular sub-area.

In particular embodiments, when multiple map packages are broadcast by a single base station, the map packages may be broadcast in a particular sequence (e.g., based on data size or size of each geographic area or sub-area of each map package) that allows an artificial reality device to predict when a map package relevant to the user is being broadcast by a particular base station. As an example, if base station 320A is responsible for broadcasting a sequence of map packages 310A-310D, base station 320A may broadcast the map packages in a particular sequence, for example in a clockwise manner (NW package 310A, then NE package 310B, then SE package 310D, and finally SW package 310C), a counterclockwise manner (NW package 310A, then SW package 310C, then SE package 310D, and finally NE package 310B), or in some other sequential manner such that an artificial reality device can intelligently predict when a particular map package is being broadcast. For example, if the device is currently located in the NW sub-area 310A, the device may, using the particular sequence, know approximately when to establish channel communications with base station 320A in order to receive the NW sub-area 310A map package. In particular embodiments, nearby or adjacent base stations may be coordinated such that each base station is broadcasting a different map package of in a sequence of map packages at any given moment. For example, if each base station 320A-320C is broadcasting a sequence of map packages, at a particular time base station 320A may be broadcasting the map package for sub-area 310A, base station 320B may be broadcasting the map package for sub-area 310B, and base station 320C may be broadcasting the map package for sub-area 310D. Thus, if each base station is broadcasting in a clockwise sequence, at a second, subsequent time base station 320A may be broadcasting the map package for sub-area 310B, base station 320B may be broadcasting the map package for sub-area 310D, and base station 320C may be broadcasting the map package for sub-area 310A. This coordination allows for greater accessibility to map packages, especially for artificial reality devices that are at a particular location such that they can establish channel communications with multiple base stations. Although this disclosure illustrates broadcasting a sequence of map packages based on geography, in particular embodiments base stations may broadcast map packages in any logical sequence, for example and not by way of limitation, broadcasting a sequence of map packages based on the level of detail in each map package (e.g., a coarse detail map package, followed by a medium detail map package, followed by a fine detail map package), broadcasting a sequence of map packages based on the type of feature descriptors in the map package (e.g., map packages with global feature descriptors broadcast first or more frequently than map packages comprising local feature descriptors, etc.). In particular embodiments map packages comprising global feature descriptors may be broadcast more frequently than map packagers with local feature descriptors.

In particular embodiments a particular base station may further utilize multiple frequencies to simultaneously broadcast multiple map packages. For example, as illustrated in FIG. 3, base station 320A could broadcast a map package for sub-area 310A at a first frequency and simultaneously broadcast a map package for sub-area 310B at a second frequency. As another example, station 320A could broadcast a coarse detail map package for sub-area 310A at a first frequency and simultaneously broadcast a fine detail map package for sub-area 310A at a second frequency. In this example, the fine detail map package may be broadcast at a higher frequency than the coarse detail map package to ensure sufficient bandwidth for the larger sized high detail map package. A further advantage to this multi-frequency approach is the ability to broadcast coarse map packages (which often contain global feature descriptors) at lower frequencies and thus over larger distances, whereas high detail map packages (which often contain local feature descriptors) can be broadcast at higher frequencies for more localized applications.

In particular embodiments the receiving artificial reality device may determine which particular map packages are required to perform localization. As an example, the device may predict relevant map packages based on a future location of the device using, for example and not by way of limitation, last known location of the device, past location history of the device, sensor data of the device (e.g., current heading, speed, etc.), or user actions or queries (e.g., the user searches for a particular location/establishment covered by a particular map package, the user opens a navigation application, etc.). As another example, the device could download the metadata or coarse map packages to perform rough localization to determine the number of matches in the coarse packages compared to a captured image of the surrounding real environment to determine which map packages may be most relevant. Based on this information the device may filter one or more map packages to identify one or more map packages likely to produce the most accurate pose of device during localization. This allows the device to save power by determining and waiting for the relevant map packages to be broadcast without having to establish persistent channel communications with one or more base stations.

In particular embodiments a receiving artificial reality device may determine when a particular map package is schedule to be broadcast and should be downloaded from a particular base station. One-way communications prevent the device from transmitting queries or requests to a base station or server for a particular map package. Thus, without the device knowing the particular sequence of map packages being broadcast by a particular base station, the device would need to persistently monitor, download, and store all broadcasted map packages, which requires significant computing resources. Various techniques may be employed to determine when the relevant map package is being broadcast so it can be received and downloaded. As an example, the device may intelligently prioritize monitoring channels of nearby base stations based on signal strength, as base stations with stronger signals are more likely to be nearby and have a higher probability of carrying features descriptors nearer to the device because of physical proximity. As another example, the artificial reality devices may receive with a metadata file that indicates the particular sequence or broadcast schedule of map packages for a particular base station, which allows the device to prioritize and monitor the broadcast of a particular base station to obtain a particular map package at the proper time. This reduces computing resources required to persistently monitor and download all broadcast map packages from base stations.

In particular embodiments, once the client device has determined and downloaded one or more map packages for a particular sub-area that are relevant for localization of the device, the device can perform localization on the device to determine a current pose of the device. Upon determining and downloading which map packages should be used, the search space can be limited to the geographic sub-area defined by the particular map packages. Ideally, the device can determine the map package most likely to produce an accurate pose in order to limit the geographic search area. As the geographic sub-area increases (due to e.g., identifying multiple relevant map packages covering multiple sub-areas) the optimization algorithm or other technique used to perform localization may take additional time, consume additional computing resources, and output less-accurate poses due to a larger search area. Limiting the search area therefore provides for faster and more accurate localization of the device. To determine a pose, the device may capture, using one or more cameras associated with the device, an image of the real environment surrounding the device. Using this image, the device can generate one or more feature descriptors for the image and compare the generated feature descriptors to one or more received feature descriptors from a map package to find a viewpoint where the features descriptors in the received map packages appear to match the generated feature descriptors. In particular embodiments the device may compare and match feature descriptors using, for example and not by way of limitation, an optimization algorithm (e.g., DFM or DFM2), machine learning, or other similar technique which can be performed solely on the device without reliance on a server or remote device. In particular embodiments the device may compare the generated feature descriptors from the captured image with feature descriptors from multiple received map packages. In this manner, the device can determine and further refine which downloaded map package should be used to produce the most accurate pose by comparing the feature descriptors of multiple map packages to determine which most closely match the generated feature descriptors from the captured image. In particular embodiments the device may further use a gravity alignment estimation to aid in the pose estimation, which can be used to filter out incorrect poses.

Figure 4:
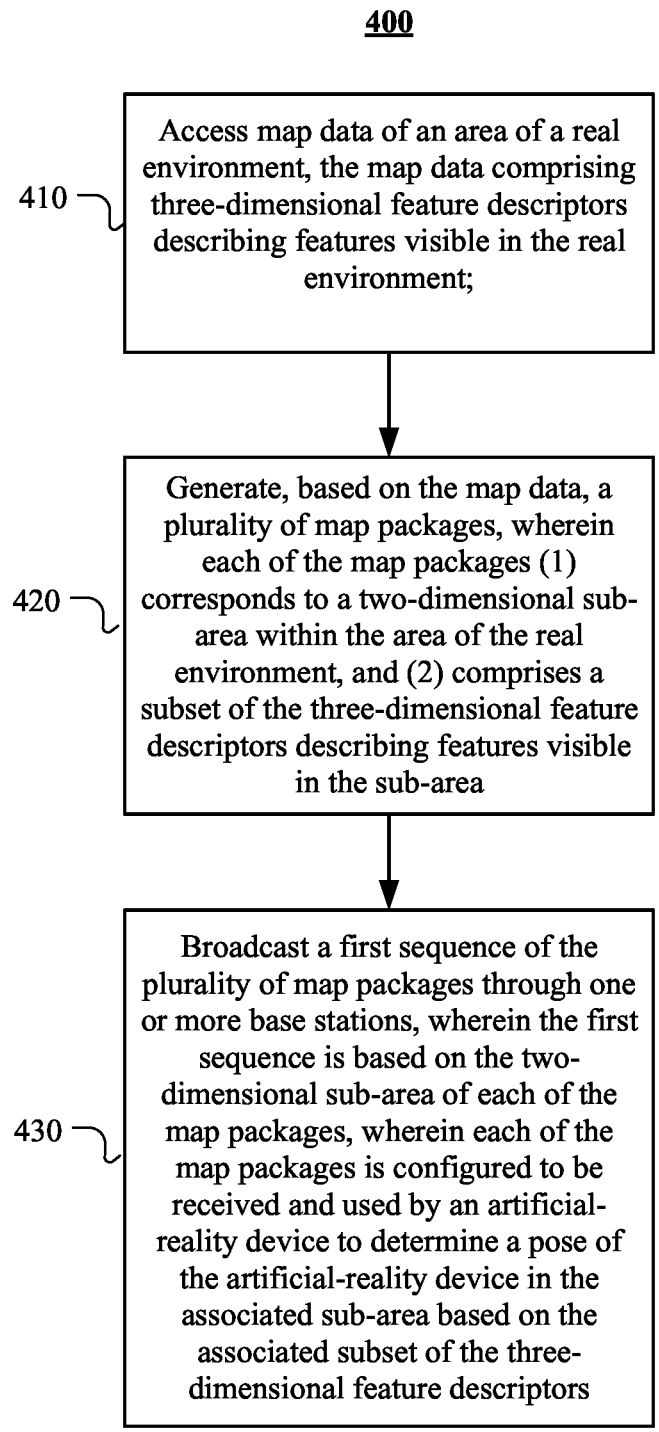
FIG. 4 illustrates an example method for broadcasting a sequence of map packages that can be used by an artificial-reality device to determine a pose of the artificial-reality device.

FIG. 4 illustrates an example method 400 for broadcasting a sequence of map packages that can be used by an artificial-reality device to determine a pose of the artificial-reality device. The method may begin at step 410, where a computing system may access map data of an area of a real environment, the map data comprising three-dimensional feature descriptors describing features visible in the real environment.

At step 420, the computing system may generate, based on the map data, a plurality of map packages, wherein each of the map packages (1) corresponds to a two-dimensional sub-area within the area of the real environment, and (2) comprises a subset of the three-dimensional feature descriptors describing features visible in the sub-area; and At step 430, the computing system may broadcast a sequence of the plurality of map packages through one or more base stations, wherein the sequence is based on the two-dimensional sub-area of each of the map packages, wherein each of the plurality of map packages is configured to be received and used by an artificial-reality device to determine a pose of the artificial-reality device in the associated sub-area based on the associated subset of the three-dimensional feature descriptors.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for broadcasting a sequence of map packages that can be used by an artificial-reality device to determine a pose of the artificial-reality device, including the particular steps of the method of FIG. 4, this disclosure contemplates any suitable method for broadcasting a sequence of map packages that can be used by an artificial-reality device to determine a pose of the artificial-reality device, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
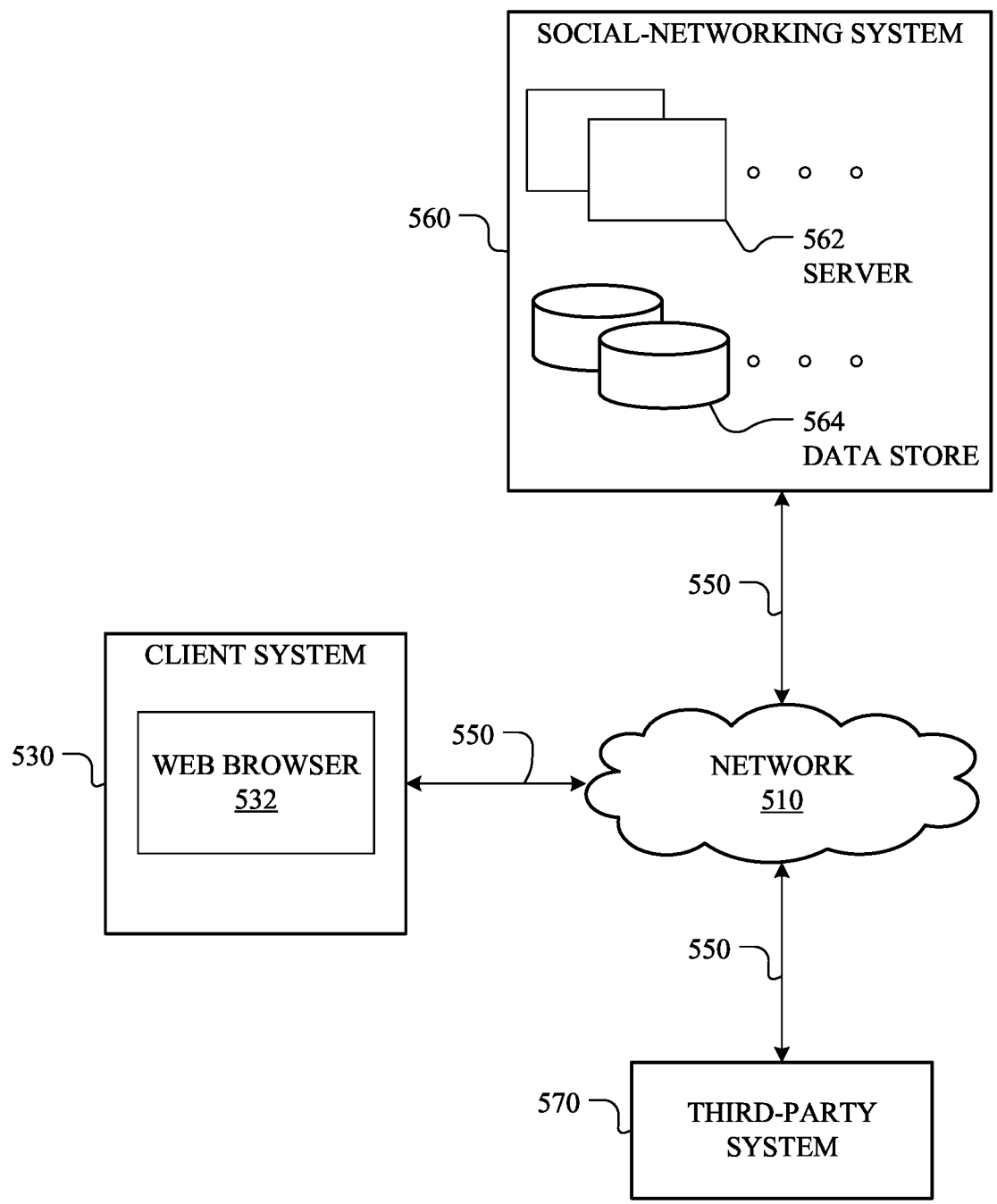
FIG. 5 illustrates an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, and may have one or more add-ons, plug-ins, or other extensions. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts, combinations of markup language and scripts, and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. As an example and not by way of limitation, client system 530 may access social-networking system 560 using a web browser 532, or a native application associated with social-networking system 560 (e.g., a mobile social-networking application, a messaging application, another suitable application, or any combination thereof) either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 560 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplates any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes-which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (e.g., relationships) to a number of other users of social-networking system 560 to whom they want to be connected. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in to or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Advertisement-pricing modules may combine social information, the current time, location information, or other suitable information to provide relevant advertisements, in the form of notifications, to a user.

Figure 6:
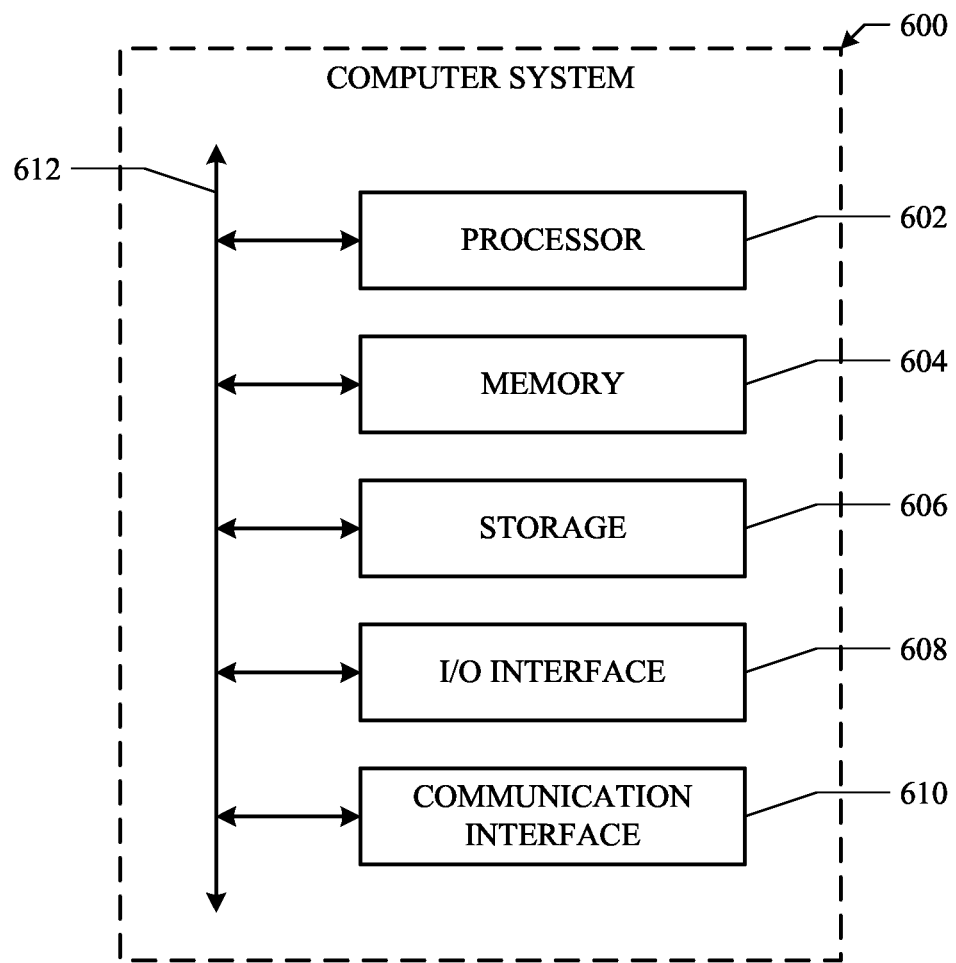
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
   accessing map data of an area of a real environment, the map data comprising three-dimensional feature descriptors describing features visible in the real environment;
   generating, based on the map data, a plurality of map packages, wherein each of the map packages (1) corresponds to a two-dimensional sub-area within the area of the real environment, and (2) comprises a subset of the three-dimensional feature descriptors describing features visible in the sub-area; and
   sequentially broadcasting the plurality of map packages in a first predetermined sequence through one or more base stations, wherein a plurality of artificial-reality devices located in a two-dimensional sub-area are each configured to: receive, over a one-way communication channel, at least one of the plurality of map packages via at least one of the sequential broadcasts, and determine a pose of the artificial-reality device based on at least a portion of the three-dimensional feature descriptors included in the received at least one map package.

2. The method of claim 1, wherein the associated sub-area corresponding to each of the map packages is equal.

3. The method of claim 1, wherein the associated sub-area corresponding to each of the map packages is used by the artificial-reality device as a bounded search space to determine the pose of the artificial-reality device.

4. The method of claim 1, wherein each of the map packages further comprises metadata containing information about a location of the associated sub-area in the real environment.

5. The method of claim 1, wherein the predetermined sequence of the plurality of map packages are sequentially broadcast through the one or more base stations at different radio frequencies.

6. The method of claim 1, wherein the predetermined sequence is further based on the associated subset of the three-dimensional feature descriptors comprising each map package in the first sequence.

7. The method of claim 1, wherein a first base station of the one or more base stations is located within a first two-dimensional sub-area, wherein the first base station broadcasts a map package associated with the first two-dimensional sub-area.

8. The method of claim 1, wherein the predetermined sequence of the plurality of map packages is broadcasted at a first frequency, further comprising:
   sequentially broadcasting a second predetermined sequence of the plurality of map packages in a second predetermined sequence at a second frequency that is greater than the first frequency, wherein the subset of the three-dimensional feature descriptors of each map package in the second predetermined sequence of the plurality of map packages is a larger subset of the three-dimensional feature descriptors than the subset of the three-dimensional feature descriptors of each map package in the predetermined sequence the plurality of map packages.

9. The method of claim 1, wherein a first artificial-reality device of the plurality of artificial-reality devices receives multiple of the plurality of map packages via multiple of the sequential broadcasts, and the first artificial-reality device is configured to:

filter the received map packages to identify one or more map packages for pose estimation, wherein a pose of the first artificial-reality device is determined based on the identified one or more map packages.

10. One or more computer-readable non-transitory storage media embodying software that is operable when executed to:

access map data of an area of a real environment, the map data comprising three-dimensional feature descriptors describing features visible in the real environment;

generate, based on the map data, a plurality of map packages, wherein each of the map packages (1) corresponds to a two-dimensional sub-area within the area of the real environment, and (2) comprises a subset of the three-dimensional feature descriptors describing features visible in the sub-area; and sequentially broadcast the plurality of map packages in a first predetermined sequence through one or more base stations, wherein a plurality of artificial-reality devices located in a two-dimensional sub-area are each configured to: receive, over a one-way communication channel, at least one of the plurality of map packages via at least one of the sequential broadcasts, and determine a pose of the artificial-reality device based on at least a portion of the three-dimensional feature descriptors included in the received at least one map package.

11. The media of claim 10, wherein the associated sub-area corresponding to each of the map packages is equal.

12. The media of claim 10, wherein the associated sub-area corresponding to each of the map packages is used by the artificial-reality device as a bounded search space to determine the pose of the artificial-reality device.

13. The media of claim 10, wherein each of the map packages further comprises metadata containing information about a location of the associated sub-area in the real environment.

14. The media of claim 10, wherein the predetermined sequence of the plurality of map packages are sequentially broadcast through the one or more base stations at different radio frequencies.

15. The media of claim 10, wherein the predetermined sequence of the plurality of map packages is broadcasted at a first frequency, wherein the software is further operable to:

sequentially broadcast a second predetermined sequence of the plurality of map packages in a second predetermined sequence at a second frequency that is greater than the first frequency, wherein the subset of the three-dimensional feature descriptors of each map package in the second predetermined sequence of the plurality of map packages is a larger subset of the three-dimensional feature descriptors than the subset of the three-dimensional feature descriptors of each map package in the first predetermined sequence the plurality of map packages.

16. A system comprising:

one or more processors; and one or more computer-readable non-transitory storage media coupled to one or more of the processors and comprising instructions operable when executed by one or more of the processors to cause the system to:

access map data of an area of a real environment, the map data comprising three-dimensional feature descriptors describing features visible in the real environment;

generate, based on the map data, a plurality of map packages, wherein each of the map packages (1) corresponds to a two-dimensional sub-area within the area of the real environment, and (2) comprises a subset of the three-dimensional feature descriptors describing features visible in the sub-area; and sequentially broadcast the plurality of map packages in a first predetermined sequence through one or more base stations, wherein a plurality of artificial-reality devices located in a two-dimensional sub-area are each configured to: receive, over a one-way communication channel, at least one of the plurality of map packages via at least one of the sequential broadcasts, and determine a pose of the artificial-reality device based on at least a portion of the three-dimensional feature descriptors included in the received at least one map package.

17. The system of claim 16, wherein the associated sub-area corresponding to each of the map packages is equal.

18. The system of claim 16, wherein the associated sub-area corresponding to each of the map packages is used by the artificial-reality device as a bounded search space to determine the pose of the artificial-reality device.

19. The system of claim 16, wherein each of the map packages further comprises metadata containing information about a location of the associated sub-area in the real environment.

20. The system of claim 16, wherein the predetermined sequence of the plurality of map packages are sequentially broadcast through the one or more base stations at different radio frequencies.

* * * * *